(12) United States Patent
Zuo et al.

(10) Patent No.: US 8,930,690 B2
(45) Date of Patent: Jan. 6, 2015

(54) OFFLOADING PACKET PROCESSING FOR NETWORKING DEVICE VIRTUALIZATION

(75) Inventors: Yue Zuo, Redmond, WA (US); Daniel M. Firestone, Seattle, WA (US); Albert Gordon Greenberg, Seattle, WA (US); HoYuen Chau, Bellevue, MA (US); Yimin Deng, Redmond, WA (US); Bryan William Tuttle, Newcastle, WA (US); Pankaj Garg, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

(21) Appl. No.: 13/551,064

(22) Filed: Jul. 17, 2012

(65) Prior Publication Data

US 2013/0254766 A1    Sep. 26, 2013

Related U.S. Application Data

(60) Provisional application No. 61/613,824, filed on Mar. 21, 2012.

(51) Int. Cl.
*H04L 29/06* (2006.01)

(52) U.S. Cl.
USPC ........................................................ 713/162

(58) Field of Classification Search
USPC ........................................................ 713/162
See application file for complete search history.

(56) References Cited

U.S. PATENT DOCUMENTS

| | | | |
|---|---|---|---|
| 7,190,668 B1 * | 3/2007 | Francis et al. ................ | 370/229 |
| 7,274,700 B2 * | 9/2007 | Jin et al. ........................ | 370/392 |
| 7,936,770 B1 | 5/2011 | Frattura et al. | |
| 2002/0062333 A1 | 5/2002 | Anand et al. | |
| 2004/0258043 A1 * | 12/2004 | Engbersen et al. ........... | 370/351 |
| 2005/0190779 A1 | 9/2005 | Hoffman et al. | |
| 2006/0045014 A1 * | 3/2006 | Charzinski .................... | 370/235 |
| 2007/0098010 A1 | 5/2007 | Dube et al. | |

(Continued)

FOREIGN PATENT DOCUMENTS

WO    WO 2010025127    3/2010

OTHER PUBLICATIONS

Kaushik Kumrar Ram et al., "sNICh: Efficient Last Hop Networking in the Data Center", ACM/IEEE Symposium on Architectures for Networking and Communications Systems (ANCS), Oct. 25, 2010, pp. 1-12.

(Continued)

*Primary Examiner* — Michael S McNally
(74) *Attorney, Agent, or Firm* — Ben Tabor; David Andrews; Micky Minhas

(57) ABSTRACT

The present invention extends to methods, systems, and computer program products for offloading packet processing for networking device virtualization. A host maintains rule set(s) for a virtual machine, and a physical network interface card (NIC) maintains flow table(s) for the virtual machine. The physical NIC receives and processes a network packet associated with the virtual machine. Processing the network packet includes the physical NIC comparing the network packet with the flow table(s) at the physical NIC. When the network packet matches with a flow in the flow table(s) at the physical NIC, the physical NIC performs an action on the network packet based on the matching flow. Alternatively, when the network packet does not match with a flow in the flow table(s) at the physical NIC, the physical NIC passes the network packet to the host partition for processing against the rule set(s).

20 Claims, 5 Drawing Sheets

(56) References Cited

U.S. PATENT DOCUMENTS

| | | | |
|---|---|---|---|
| 2007/0174850 A1* | 7/2007 | El Zur | 719/321 |
| 2008/0271134 A1* | 10/2008 | Johnson et al. | 726/13 |
| 2010/0014526 A1 | 1/2010 | Chavan et al. | |
| 2010/0054129 A1 | 3/2010 | Kuik et al. | |
| 2010/0085975 A1 | 4/2010 | Wang et al. | |
| 2010/0150164 A1 | 6/2010 | Ma | |
| 2010/0169536 A1* | 7/2010 | Shedel et al. | 711/6 |
| 2010/0333189 A1 | 12/2010 | Droux et al. | |
| 2011/0103389 A1 | 5/2011 | Kidambi | |
| 2011/0107331 A1* | 5/2011 | Evans et al. | 718/1 |
| 2011/0231568 A1 | 9/2011 | Bansal et al. | |
| 2011/0314469 A1 | 12/2011 | Qian et al. | |
| 2011/0320632 A1 | 12/2011 | Karino | |
| 2012/0079478 A1* | 3/2012 | Galles et al. | 718/1 |
| 2012/0124572 A1* | 5/2012 | Cunningham et al. | 718/1 |

OTHER PUBLICATIONS

Hideyuki Shimonishi et al., "Virtualized Network Infrastructure Using Open Flow", IEEE/IFIP Network Operations and Management Symposium Workshops (NOMS Wksps), Apr. 19, 2010, pp. 74-79.

Y. Luo et al., "Accelerated Virtual Switching with Programmable NICs for Scalable Data Center Networking", SIGCOMM 2010, Sep. 3, 2010, available at <<http://conferences.sigcomm.org/sigcomm/2010/papers/visa/p65.pdf>>.

Jiuxing Liu et al., "High Performance VMM-Bypass I/O in Virtual Machines", Proceedings of USENIX 2006 Annual Technical Conference, Jun. 1, 2006, pp. 29-42. Available at <<http://www.cse.unsw.edu.au/~cs9242/06/exam/paper2.pdf>>.

Georg, M. et al., "Improving Individual Flow Performance with Multiple Queue Fair Queuing", Quality of Service, 2007 Fifteenth IEEE International Workshop on, vol., no., pp. 141-144, Jun. 21-22, 2007.

Office Action dated Dec. 23, 2013 cited in U.S. Appl. No. 13/529,747 (Copy Attached).

"Virtualized Networking Enhancements in NDIS 6.30", Retreived on Jun. 22, 2012. http://madn.microsoft.com/en-us/library/windows/hardware/hh440272(v=vs.85)aspx.

"Broadcom Ethernet Network Controller Enhanced Virtulization Functionality", Published Oct. 2009. http://www.broadcom.com/collateral/wp/Virtualization-WP100-R.pdf.

Office Action dated Jul. 21, 2014 cited in U.S. Appl. No. 13/529,747 (Copy Attached).

\* cited by examiner

OFFLOADING PACKET PROCESSING FOR NETWORKING DEVICE VIRTUALIZATION

CROSS-REFERENCE TO RELATED APPLICATIONS

This application claims the benefit of and priority to U.S. Provisional Application No. 61/613,824, entitled "OFFLOADING PACKET PROCESSING FOR NETWORKING DEVICE VIRTUALIZATION," filed on Mar. 21, 2012, which is incorporated by reference in its entirety herein.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some computer systems are configured to provide virtualized environments for hosting one or more virtual machines. For example, para-virtualized execution environments include hypervisors. Hypervisors provide a parent partition and one or more child partitions (or virtual machines). The parent partition is configured to run a host operating system and to manage a virtualization stack. Each child partition is configured to run a corresponding guest operating system. Hypervisors also provide software interfaces that enable child partitions to access physical devices through virtual devices (drivers) running within the guest operating systems.

A common scenario in virtualization is to manage network packets among virtual machines that are executing at a virtualization host computer system, and to manage network packets flowing between the virtual machines and computers systems remote from the host computer system. As such, virtualization stacks at host operating systems may include networking virtualization stacks, or virtual switches. Virtual switches are configured to intercept, inspect, and manipulate network packets being communicated in connection the virtual machines. Doing so, however, can be inefficient, as it causes frequent and costly (e.g., in terms of CPU usage) context switches between the host operating system and guest operating systems.

A recent development in virtualization has been Single-Root I/O Virtualization (SRIOV). SRIOV is an extension to the Peripheral Component Interconnect Express (PCIe) bus architecture that enables PCIe devices to communicate directly with parent and child partitions. As such, SRIOV enables PCIe devices to expose themselves directly to virtual machines (through the hypervisor). For example, a SRIOV-compliant physical Network Interface Card (NIC) may present a physical function to the host partition and present one or more virtual functions to corresponding child partitions. The host operating system can then include a physical function driver that communicates with the physical function, and each guest operating system can execute a virtual function driver that communicates with the corresponding virtual function. The physical NIC can then communicate network packets directly with guest operating systems (bypassing the host operating system), which can greatly improve network performance.

Despite the advances that SRIOV brings, there remain some inefficiencies in the area of network packet processing in virtualization environments.

BRIEF SUMMARY

The present invention extends to methods, systems, and computer program products for offloading packet processing for networking device virtualization. For example, embodiments of the invention provide a generic network packet rule and flow model that enables a portion of network packet processing at a virtual machine host to be offloaded from the host to a physical NIC. In particular, embodiments of the invention enable all or portions of one or more flow tables at a parent partition (i.e., host operating system) to be offloaded to a physical NIC. Doing so enables the physical NIC to perform packet processing in accordance with defined rules, while increasing the performance of network packet processing in virtual machine environments.

In some embodiments, a method for processing network packets for a virtual machine executing at a computer system includes a host partition maintaining one or more rule sets for a virtual machine. The method also includes a physical NIC maintaining one or more flow tables for the virtual machine. The physical NIC receives a network packet associated with the virtual machine, and processes the network packet for the virtual machine. Processing the network packet includes the physical NIC comparing the network packet with the one or more flow tables. When the network packet matches with a flow in the one or more flow tables, the physical NIC performs an action on the network packet based on the matching flow. Alternatively, when the network packet does not match with a flow in the one or more flow tables, the physical NIC passes the network packet to the host partition for processing against the one or more rule sets.

On other embodiments, a method for processing network packets for a virtual machine executing at the computer system includes a virtual switch maintaining one or more rule sets for a virtual machine and also maintaining one or more flow table tables for the virtual machine. The virtual switch offloads at least a portion of the one or more flow tables to the physical NIC. The virtual switch processes a network packet for the virtual machine. Processing the network packet includes the virtual switch receiving the network packet from one of the virtual machine or the physical NIC, and the virtual switch matching the network packet with a rule in the one or more rule sets. Based on matching the network packet with the rule, the virtual switch creates a flow in the one or more flow tables and offloads the flow to the physical NIC.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
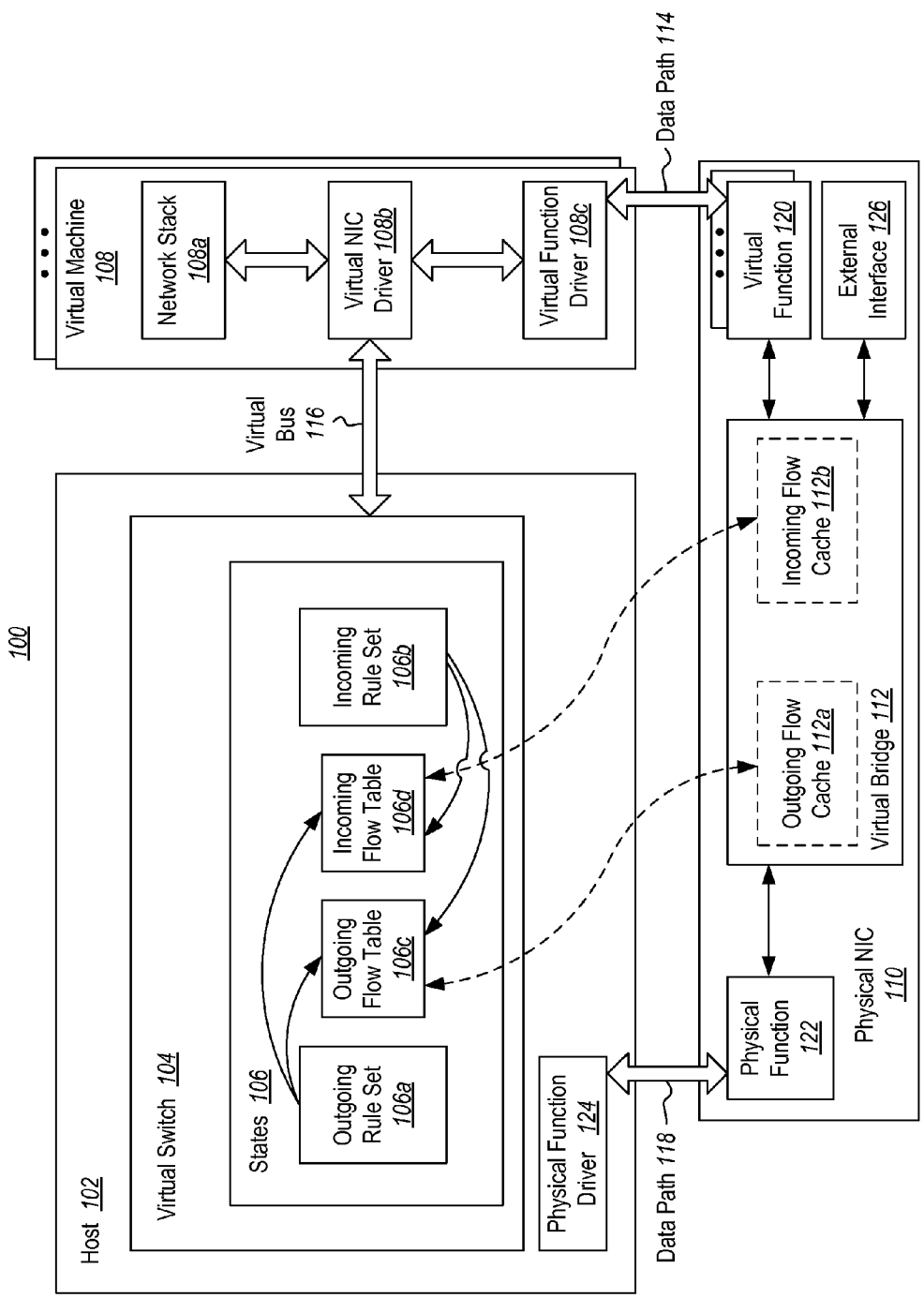
FIG. 1 illustrates an example computer architecture that facilitates offloading packet processing to a physical NIC for networking device virtualization.

The present invention extends to methods, systems, and computer program products for offloading packet processing for networking device virtualization. For example, embodiments of the invention provide a generic network packet rule and flow model that enables a portion of network packet processing at a virtual machine host to be offloaded from the host to a physical NIC. In particular, embodiments of the invention enable all or portions of one or more flow tables at a parent partition (i.e., host operating system) to be offloaded to a physical NIC. Doing so enables the physical NIC to perform packet processing in accordance with defined rules, while increasing the performance of network packet processing in virtual machine environments.

In some embodiments, a method for processing network packets for a virtual machine executing at a computer system includes a host partition maintaining one or more rule sets for a virtual machine. The method also includes a physical NIC maintaining one or more flow tables for the virtual machine. The physical NIC receives a network packet associated with the virtual machine, and processes the network packet for the virtual machine. Processing the network packet includes the physical NIC comparing the network packet with the one or more flow tables. When the network packet matches with a flow in the one or more flow tables, the physical NIC performs an action on the network packet based on the matching flow. Alternatively, when the network packet does not match with a flow in the one or more flow tables, the physical NIC passes the network packet to the host partition for processing against the one or more rule sets.

On other embodiments, a method for processing network packets for a virtual machine executing at the computer system includes a virtual switch maintaining one or more rule sets for a virtual machine and also maintaining one or more flow table tables for the virtual machine. The virtual switch offloads at least a portion of the one or more flow tables to the physical NIC. The virtual switch processes a network packet for the virtual machine. Processing the network packet includes the virtual switch receiving the network packet from one of the virtual machine or the physical NIC, and the virtual switch matching the network packet with a rule in the one or more rule sets. Based on matching the network packet with the rule, the virtual switch creates a flow in the one or more flow tables and offloads the flow to the physical NIC.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. In some embodiments, the invention may be practiced in connection with SRIOV-compliant physical NICs, however the scope of the invention extends beyond SRIOV.

Embodiments of the invention operate in connection with a host (e.g., a root partition) that executes one or more virtual machines. The host includes a virtual switch that performs packet processing (e.g., inspection and possibly manipulation) of network packets being sent and/or received by the virtual machines. For example, embodiments of the invention can process Internet Protocol (IP) packets, RDMA over Converged Ethernet (RoCE) packets, Fibre Channel over Ethernet (FCoE) packets, etc. In addition, embodiments of the invention provide a generic rule and flow model that enables at least a portion of the packet processing to be offloaded from the host to a physical NIC, such as an Ethernet NIC, an InfiniBand NIC, or other type of physical fabric. Embodiments of the invention therefore enable packet processing in a generic manner, eliminating the need to develop different virtual switch modules for different types of packet processing.

In particular, embodiments include offloading one or more flow tables (or portions thereof) to a physical NIC (such as a SRIOV-compliant physical NIC). As such, a virtual bridge at the physical NIC is enabled to perform packet processing, similar to the virtual switch at the host. For example, if a packet is received at the physical NIC, the virtual bridge may match the packet to an offloaded flow. The virtual bridge at the physical NIC can then take the appropriate action for the flow without involving the host. Doing so eliminates inefficiencies associated with doing all rule/flow packet processing at the host.

Referring now to the Figures, FIG. 1 illustrates an example computer architecture 100 that facilitates offloading packet processing to a physical NIC for networking device virtualization. As depicted, computer architecture 100 includes host 102, virtual machine 108, and physical NIC 110.

Host 102 provides a virtualization environment. For example, host 102 may include a parent partition (which executes a host operating system) and one or more child partitions. Each child partition can be viewed as providing a virtualized hardware environment for executing a corresponding virtual machine, such as virtual machine 108. In some embodiments, host 102 is used a part of a cloud computing environment that provides virtual machines to tenants.

Each virtual machine (including virtual machine 108) executes one or more virtualized applications, such as an operating system, application software, etc. As depicted, virtual machine 108 includes network stack 108a (e.g., a TCP/IP stack), virtual NIC driver 108b, and virtual function driver 108c. Using network stack 108a, virtual NIC driver 108b, and virtual function driver 108c, virtual machine 108 is capable of sending and/or receiving network packets and other information through host 102 over virtual bus 116 and/or through physical NIC 110 over data path 114.

Physical NIC 110 comprises physical hardware that is capable of being virtualized and that is connected to other computer systems and/or networks using one or more external interfaces (e.g., the depicted external interface 126). Although only one physical NIC is depicted, computer architecture can include any number of physical NICs. Physical NIC 110 includes virtual bridge 112. Virtual bridge 112 bridges virtual functions and physical functions at physical NIC 110 and performs packet inspection and manipulation. Virtual bridge 112 works with virtual switch 104 at host 102 to regulate network traffic, as described in greater detail later. As such, physical NIC 110 may expose one or more virtual functions to one or more virtual machines that are being hosted at host 102. In addition, physical NIC 110 may expose one or more physical functions to host 102.

For example, FIG. 1 depicts that physical NIC 110 presents physical function 122 to host 102. FIG. 1 also depicts that host 102 includes a corresponding physical function driver 124, and that data path 118 connects physical function 122 at physical NIC 110 and physical function driver 124 at host 102. As such, physical function 122 and physical function driver 124 can operate for exchange of network packets between physical NIC 110 and host 102. For example, physical function driver 124 can communicate with virtual switch 104 at host 102, and physical function 122 can communicate with virtual bridge 112 at physical NIC 110.

FIG. 1 also depicts that physical NIC 110 presents virtual function 120 to virtual machine 108, which corresponds with virtual function driver 108c. Data path 114 connects virtual function 120 at physical NIC 110 and virtual function driver 108c at virtual machine 108. Physical NIC 110 may present more than one virtual function to virtual machine 108, and/or may present additional virtual functions to additional virtual machines. In general, each virtual machine can directly access an assigned virtual function. For example, a virtual machine can use its virtual function driver to communicate network packets with an assigned virtual function at physical NIC 110 without intervention from host 102. Doing so can reduce processor usage and network latency. For example, virtual machine 108 and physical NIC 110 can communicate directly using virtual function 120 and virtual function driver 108c over data path 114.

As indicated previously, physical NIC 110 may, in some embodiments, comprise PCIe hardware that is SRIOV-compliant. In such embodiments, one or more of virtual function 120 or physical function 122 may comprise PCIe functions. However, it will be appreciated that the principles described herein may be applied to a variety of hardware devices, and are not limited to SRIOV-compliant devices or to PCIe devices.

In some embodiments, one or more virtual machines hosted at host 102 may be associated with rules (incoming and/or outgoing) and possibly flows (incoming and/or outgoing) in accordance with a generic rule/flow model. As depicted, host 102 includes virtual switch 104. Virtual switch 104 is configured to inspect and manipulate network packets being sent from and received by any hosted virtual machine in accordance with the generic rule/flow model. For example, based on defined rules and flows, virtual switch 104 may allow packets, block packets, re-route packets, perform NAT, or perform any other appropriate packet inspection/manipulation for the networking technologies and devices being used.

As used herein, a rule defines a packet flow policy (or a portion thereof) based on one or more rule conditions and one or more rule actions. In some embodiments, rules are specific to a particular virtual machine. Rules may be defined by administrators, or may be defined by higher-level systems. In some embodiments, rules are static, or relatively static. In some embodiments, rules are stored in rule sets and are configured for linear matching.

Rule conditions may be defined using tuples, which include fields and matching values. Tuples can comprise any combination of fields appropriate for the network protocol(s) and hardware device(s) in use. Tuples may include, for example source and/or destination network address (e.g., IP address, when IP is being used), source and/or destination port, protocol (e.g., Transmission Control Protocol (TCP), User Datagram Protocol (UDP)), source and/or destination hardware address (e.g., Ethernet MAC address), or combinations thereof. For example, an exemplary rule condition may defined according to a five-tuple such as '192.168.0.*, *, *, *, TCP', which would match any network packet on the 192.168.0.* network having any source IP address, any source port, any destination IP address, any destination port, and using the TCP protocol. In some embodiments, tuples may relate not only to flow, but also to packet condition. For example, tuples may include fields relating to IP Type of Service (ToS). One of ordinary skill in the art will recognize that other tuples are also possible, including tuples relating to networking technologies not yet developed.

Rule actions can comprise any appropriate packet routing and/or manipulation operation. For example, some exemplary rule actions may include deny, allow, Network Address Translation (NAT), map, meter, decapsulate, encapsulate, etc. One of ordinary skill in the art will recognize that a variety of other rule actions are possible, including actions relating to networking technologies not yet developed.

Rules can be used to define a rich set of packet processing policies. For example, using rule conditions (tuples) and rule actions, a rule may specify that UDP packets from a particular IP address are allowed. In another example, a rule may specify that TCP packets sent to any destination with a specified port are subject to NAT. Combining the above exemplary five-tuple example with an 'allow' action, an exemplary rule may be defined as 'allow 192.168.0.*, *, *, *, TCP' meaning that any network packet on the 192.168.0.* network having any source IP address, any source port, any destination IP address, any destination port, and using the TCP protocol should be allowed.

As used herein, a flow is a dynamic state that is created based on rules. For example, when a network packet matches a rule, a flow may be created based on the rule. As such, similar to rules, flows may also be defined in terms of conditions (tuples) and actions. Flows store context about network connections, and can be used to determine how to handle a current packet in a stream or context based on previous packets in the stream or context. Flows may be subject to timeout. In some embodiments, flows are stored in one or more flow tables, such as an incoming flow table and/or an outgoing flow table. For example, when a network packet matches the exemplary 'allow 192.168.0.*, *, *, *, TCP' rule, a corresponding flow may be created in one or more appropriate flow tables. In some embodiments, flows are indexed based on a flow's tuples (e.g., using one or more hashes).

Along these lines, FIG. 1 depicts that virtual switch includes states 106 for virtual machine 108, which can include various types of states, such as the depicted outgoing rule set 106a, incoming rule set 106b, outgoing flow table 106c, and incoming flow table 106d. Outgoing rule set 106a defines one or more rules that apply to packets being sent by virtual machine 108, and incoming rule set 106b defines one or more rules that apply to packets being received on behalf of virtual machine 108. When a packet matches a rule in a corresponding rule set, a flow may be created in outgoing flow table 106c and/or incoming flow table 106d. One will appreciate that in some circumstances states 106 may include a subset of the depicted states.

As an example, when virtual switch 104 receives a network packet that is associated with virtual machine 108 (e.g., from physical NIC 110 or from a hosted virtual machine) that does not match a flow in an appropriate flow table (106c, 106d), virtual switch 104 can examine the appropriate rule set (i.e., incoming rule set 106b for a packet being received on behalf of virtual machine 108 or outgoing rule set 106a for a packet being sent by virtual machine 108) for a matching rule. If virtual switch 104 finds a matching rule, virtual switch 104 can takes an appropriate action on the packet as defined by the rule (e.g., allow/block/NAT, etc.).

If virtual switch 104 finds a matching rule, virtual switch 104 may also create a flow (or a pair of flows) in outgoing flow table 106c and/or incoming flow table 106d for use in processing subsequent packets in the stream/context. For example, when the packet matches a rule in outgoing rule set 106a, virtual switch 104 may create a flow in outgoing flow table 106c and/or incoming flow table 106d (as depicted by the arrows connecting outgoing rule set 106a and the flow tables 106c, 106d). Alternatively, when the packet matches a rule in incoming rule set 106b, virtual switch 104 may create a flow in outgoing flow table 106c and/or incoming flow table 106d (as depicted by the arrows between incoming rule set 106b and the flow tables 106c, 106d). It will be appreciated that by creating flows in the opposite direction's flow table, virtual switch may implement stateful firewalls.

Virtual switch 104 can also offload flow state(s) to outgoing flow cache 112a and/or incoming flow cache 112b at virtual bridge 112 of physical NIC 110, as depicted by the dashed arrow between outgoing flow table 106c and outgoing flow cache 112a and the dashed arrow between incoming flow table 106d and incoming flow cache 112b. For example, virtual switch 104 may send one or more requests over data path 118 to physical NIC 100 requesting creation of flows at flow caches 112a, 112b. In some circumstances, offloading flow state to physical NIC 110 enables virtual bridge 112 to perform packet processing apart from virtual switch 104, thereby reducing processor usage at host 102. For example, subsequent to a flow being offloaded to physical NIC 110, physical NIC 110 may receive a subsequent packet of the same stream (e.g., from virtual machine 108 over data path 114 or from another computer system over external interface 126). In this circumstance, virtual bridge 112 can match the subsequent packet to a flow state in the appropriate flow cache 112a, 112b, and perform the action defined in the flow itself, without first sending the packet to virtual switch 104.

Using the foregoing configuration, virtual machine 108 may use virtual function driver 108c to send an outgoing network packet to virtual function 120 of physical NIC 110 over data path 114. Upon receiving the network packet, virtual bridge 112 searches outgoing flow cache 112a for a matching flow. If virtual bridge 112 finds a matching flow in outgoing flow cache 112a, virtual bridge 112 takes the action defined in the flow. For example, virtual bridge 112 may perform a packet manipulation operation and/or may forward the network packet to a destination virtual machine or to another computer system over external interface 126.

Otherwise, if virtual bridge 112 does not find a matching flow in outgoing flow cache 112a, two alternative actions may occur. In a first embodiment, virtual bridge 112 rejects the network packet to virtual machine 108 (e.g., over data path 114). Virtual machine 108 then forwards the network packet to virtual switch 104 over virtual bus 116. In a second embodiment, virtual bridge 112 uses physical function 122 to send the network packet to physical function driver 124 over data path 118. Physical function driver 124, in turn, routes the network packet to virtual switch 104. In either embodiment, after virtual switch 104 receives the network packet, virtual switch 104 attempts to match the network packet to a flow in outgoing flow table 106c. If the network packet does not match a flow in outgoing flow table 106c, virtual switch 104 attempts to match the network packet to a rule in outgoing rule set 106a. If a matching rule is found in outgoing rule set 106a, virtual switch 104 takes an appropriate action (e.g., allow/block/NAT, etc.) as defined by the matching rule, and may create one or more flows at one or both of flow tables 106c/106d and potentially at one or both of flow caches 112a/112b.

Also using the foregoing configuration, physical NIC 110 may receive an incoming network packet on behalf of virtual machine 108 (e.g., from another virtual machine over a corresponding virtual function or from another computer system over external interface 126). Upon receipt of the network packet, virtual bridge 112 searches incoming flow cache 112b for a matching flow. If virtual bridge 112 finds a matching flow in incoming flow cache 112b, virtual bridge 112 takes the appropriate action (e.g., allow/block/NAT, etc.) defined in the flow. For example, virtual bridge 112 may use virtual function 120 and data path 114 to forward the packet to virtual function driver 108c at virtual machine 108. If virtual bridge 112 does not find a matching flow in incoming flow cache 112b, virtual bridge 112 forwards the packet to virtual switch 104 at host 102 using physical function 122 and data path 118 or virtual function 120 and data path 114. Virtual switch 104 then processes the packet as described above in the context of an outgoing network packet.

It will be appreciated that outgoing flow cache 112a and incoming flow cache 112a may represent only a portion or a subset of the full flow tables (i.e., outgoing flow table 106c and incoming flow table 106d). For example, physical NIC 110 may have limited memory due to cost or other design constraints. As such, storing only a portion of flow tables 106c/106d in flow caches 112a/112b decreases the amount of memory needed to offload flow tables to physical NIC 110. Because outgoing flow cache 112a and incoming flow cache 112a may not include full flow state data a cache miss may occur when processing a packet at virtual bridge 112. When a cache miss occurs, virtual bridge 112 forwards the packet to virtual switch 104 for additional processing. One will appreciate that different kinds of cache replacement/freshness policies may be employed. For example, flow state may be placed on physical NIC 110 after a cache miss occurs, entries may be expired from physical NIC 110 after a predefined amount of inactivity, etc.

In addition, in some embodiments, only certain types of flows are stored at physical NIC 110. For example, virtual bridge 112 may support performing only limited types of operations/actions. As such, only flows related to operations/actions supported by virtual bridge 112 may be stored at physical NIC 110. In these embodiments, any additional operations/actions are handled at virtual switch 104.

Figure 2:
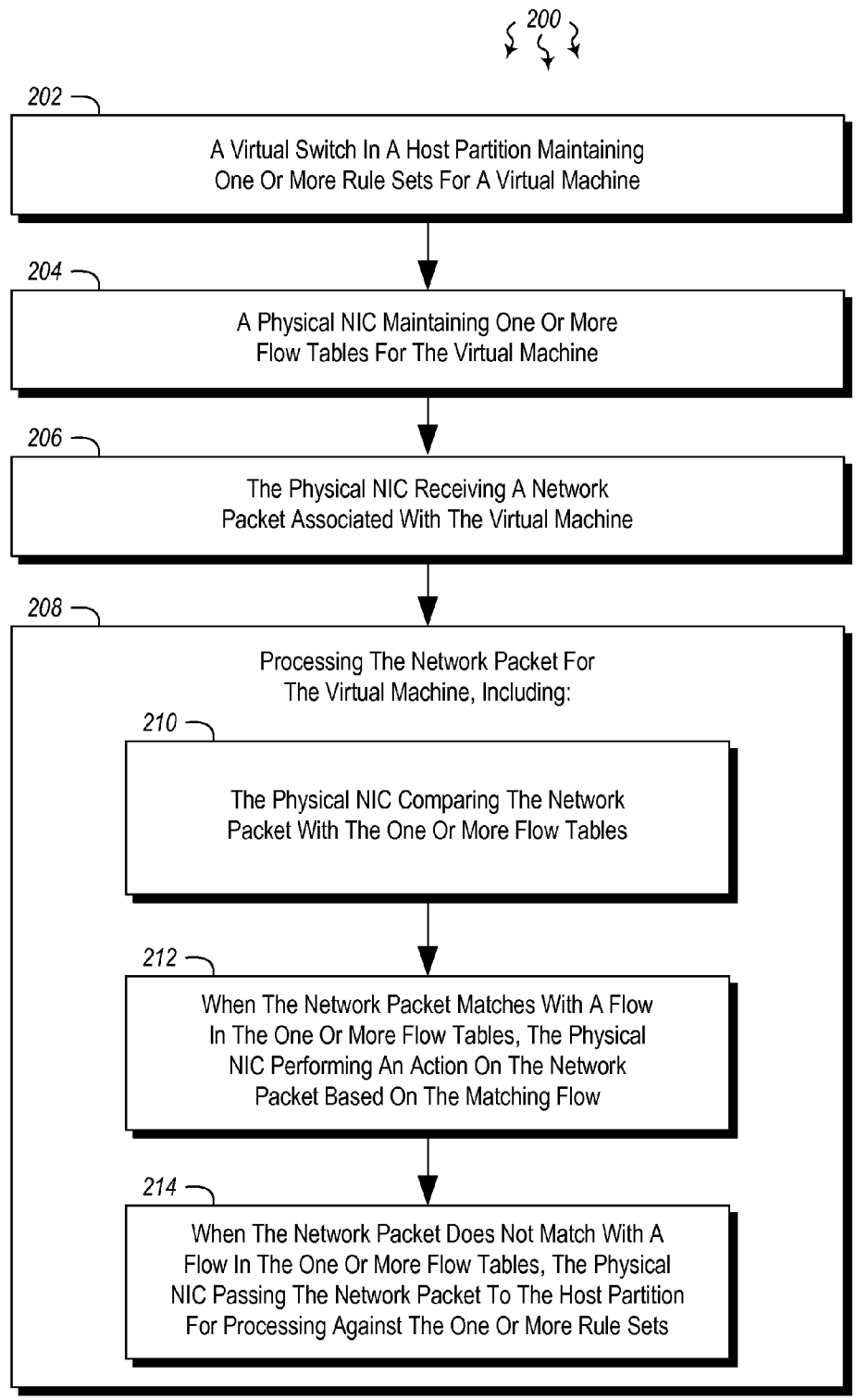
FIG. 2 illustrates a flow chart of an example method for processing network packets for a virtual machine executing at the computer system.

FIG. 2 illustrates a flow chart of an example method 200 for processing network packets for a virtual machine executing at the computer system. Method 200 will be described with respect to the components and data of computer architecture 100.

Method 200 includes an act of a virtual switch in a host partition maintaining one or more rule sets for a virtual machine (act 202). For example, virtual switch 104 at host 102 can maintain states 106 for virtual machine 108. States 106 can include one or both of outgoing rule set 106a for virtual machine 108 or incoming rule set 106b for virtual machine 108. States 106 may also include one or more flow tables for virtual machine 108, such as outgoing flow table 106c and incoming flow table 106d. While not depicted, virtual switch 104 can store states (e.g., rule sets, flow tables, etc.) for other additional virtual machines.

Method 200 also includes an act of a physical NIC maintaining one or more flow tables for the virtual machine (act 204). For example, physical NIC 110 can store outgoing flow cache 112a and/or incoming flow cache 112b for virtual machine 208. The flow caches may include all, or only a portion of, any flow tables at host 102. While not depicted, physical NIC 110 can store flow tables for other additional virtual machines.

Method 200 also includes an act of the physical NIC receiving a network packet associated with the virtual machine (act 206). For example, physical NIC can receive a network packet from another computer system over external interface 126, can receive a network packet from virtual machine 108 over virtual function 120, or can receive an network packet from another virtual machine at host 220 over another virtual function that is associated with that virtual machine.

Method 200 also includes an act of processing a network packet for the virtual machine (act 208). For example, virtual bridge 112 can process a network packet received from virtual machine 108 or received on behalf of virtual machine 108 (i.e., a network packet being received by virtual machine 108).

Act 208 includes an act of the physical NIC comparing the network packet with the one or more flow tables (act 210). For example, virtual bridge 112 can compare the network packet to outgoing flow cache 112a if the packet is being sent by virtual machine 108, or virtual bridge 112 can compare the network packet to incoming flow cache 112b if the packet is being received on behalf of virtual machine 108.

Act 208 also includes, when the network packet matches with a flow in the one or more flow tables, an act of the physical NIC performing an action on the network packet based on the matching flow (act 212). For example, if the network packet matches a flow in outgoing flow cache 112a or incoming flow cache 112b, virtual bridge 112 can perform an action specified in the flow (e.g., allow, reject, NAT, etc.).

Act 208 also includes, when the network packet does not match with a flow in the one or more flow tables, an act of the physical NIC passing the network packet to the host for processing against the one or more rule sets (act 214). For example, if the network packet does not match a flow in outgoing flow cache 112a or incoming flow cache 112b, virtual bridge 112 can send the packet to virtual switch 104 at host 102 for additional processing. In some embodiments, virtual bridge 112 sends the network packet directly to host 102 using physical function 122 and data path 118. In other embodiments, virtual bridge 112 sends the network packet indirectly to host 102 using virtual function 120 and data path 114 (i.e., though virtual machine 108 and over virtual bus 116).

When received, host 102 can pass the network packet to virtual switch 104. Virtual switch 104, in turn, can compare the network packet to state 106 (i.e., flow tables, rule sets) and take any appropriate action. For example, if the network packet matches a flow at host 102, virtual switch 104 may take the appropriate action (e.g., allow, reject, NAT, etc.) and potentially update a flow cache at physical NIC 110. If the network packet does not match a flow at host 102 (or if no appropriate flow exists) virtual switch 104 may compare the network packet to an appropriate rule set, take an appropriate action as specified in any matching rule, and potentially create one or more new flows (e.g., at states 206 and physical NIC 110).

Figure 3:
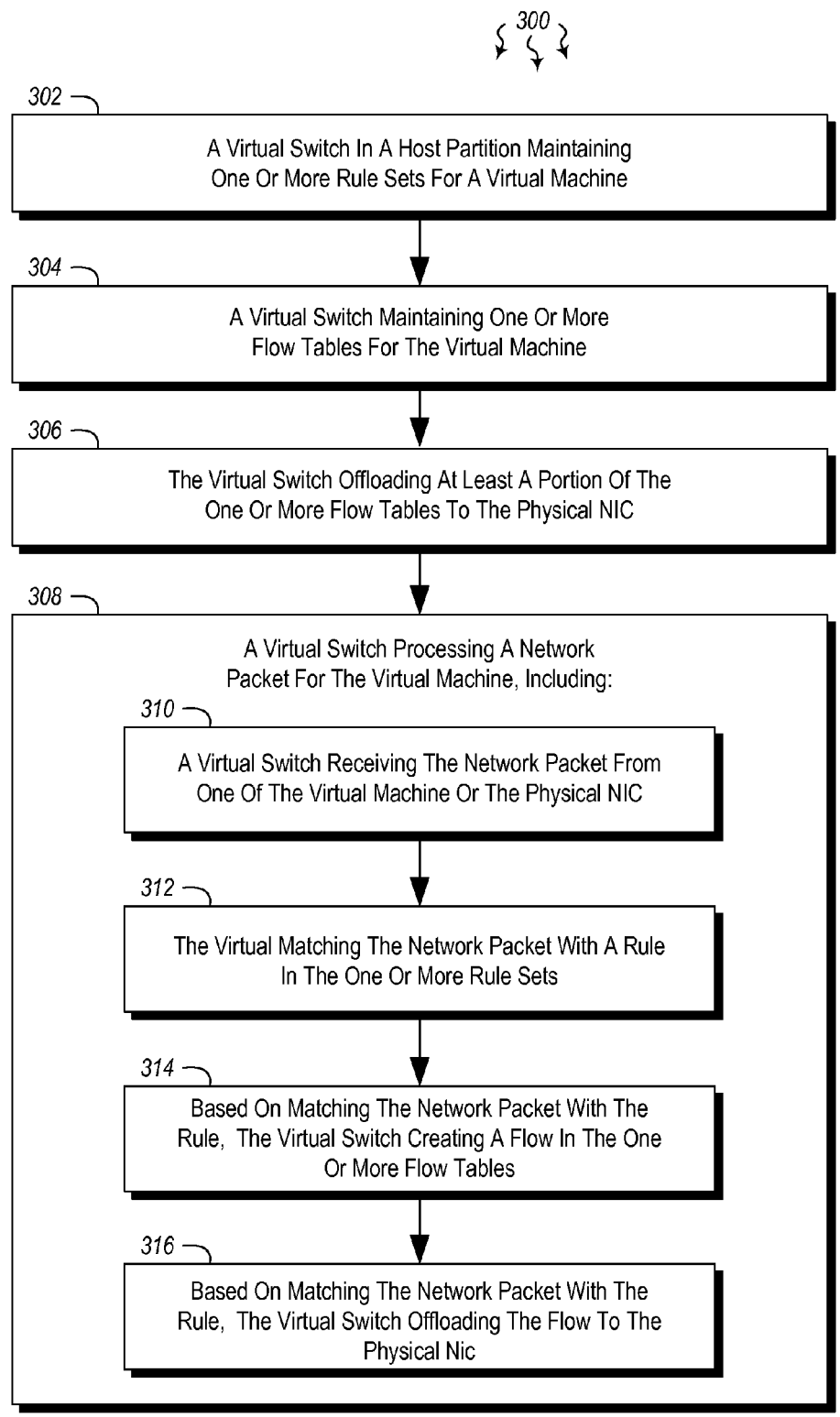
FIG. 3 illustrates a flow chart of an alternate example method for processing network packets for a virtual machine executing at a computer system.

FIG. 3 illustrates a flow chart of an additional example method 300 for processing network packets for a virtual machine executing at a computer system. Method 300 will be described with respect to the components and data of computer architecture 100.

Method 300 includes an act of an act of a virtual switch in a host partition maintaining one or more rule sets for a virtual machine (act 302). For example, virtual switch 104 at host 102 can maintain states 106 for virtual machine 108. States 106 can include one or both of outgoing rule set 106a for virtual machine 108 or incoming rule set 106b for virtual machine 108.

Method 300 also includes an act of an act of the virtual switch maintaining one or more flow table tables for the virtual machine (act 304). For example, states 106 can include one or both of outgoing flow table 106c for virtual machine 108 or incoming flow tale 106d for virtual machine 108.

Method 300 also includes an act of the virtual switch offloading at least a portion of the one or more flow tables to the physical NIC (act 306). For example, virtual switch 104 can offload one or more flows from outgoing flow table 106c to outgoing flow cache 112a. Additionally or alternatively, virtual switch 104 can offload one or more flows from incoming flow table 106d to incoming flow cache 112b.

Method 300 also includes an act of the virtual switch processing a network packet for the virtual machine (act 308). For example, virtual switch 104 can process a network packet received from or on behalf of virtual machine 108.

Act 308 includes an act of the virtual switch receiving the network packet from one of the virtual machine or the physical NIC (act 310). For example, virtual switch 104 can receive the network packet either from virtual machine 108 over virtual bus 216, or from physical NIC 110 over data path 118 (and physical function driver 124).

Act 308 also includes an act of the virtual switch matching the network packet with a rule in the one or more rule sets (act 312). For example, if the network packet is being sent by virtual machine 108, virtual switch 104 can match the packet against outgoing rule set 106a. Alternatively, if the network packet is being received on behalf of virtual machine 108, virtual switch 104 can match the packet against incoming rule set 106b.

Act 308 also includes, based on matching the network packet with the rule, an act of the virtual switch creating a flow in the one or more flow tables (act 314). For example, after matching the network packet against a rule in one of outgoing rule set 106a or incoming rule set 106b, virtual switch can create one or more flows based on the rule in outgoing flow table 106c and/or incoming flow table 106d.

Act 308 also includes, based on matching the network packet with the rule, an act of the virtual switch offloading the flow to the physical NIC (act 316). For example, based on the matching rule, virtual switch 104 can offload the flow outgoing flow cache 112a and/or incoming flow cache 112b.

Figure 4:
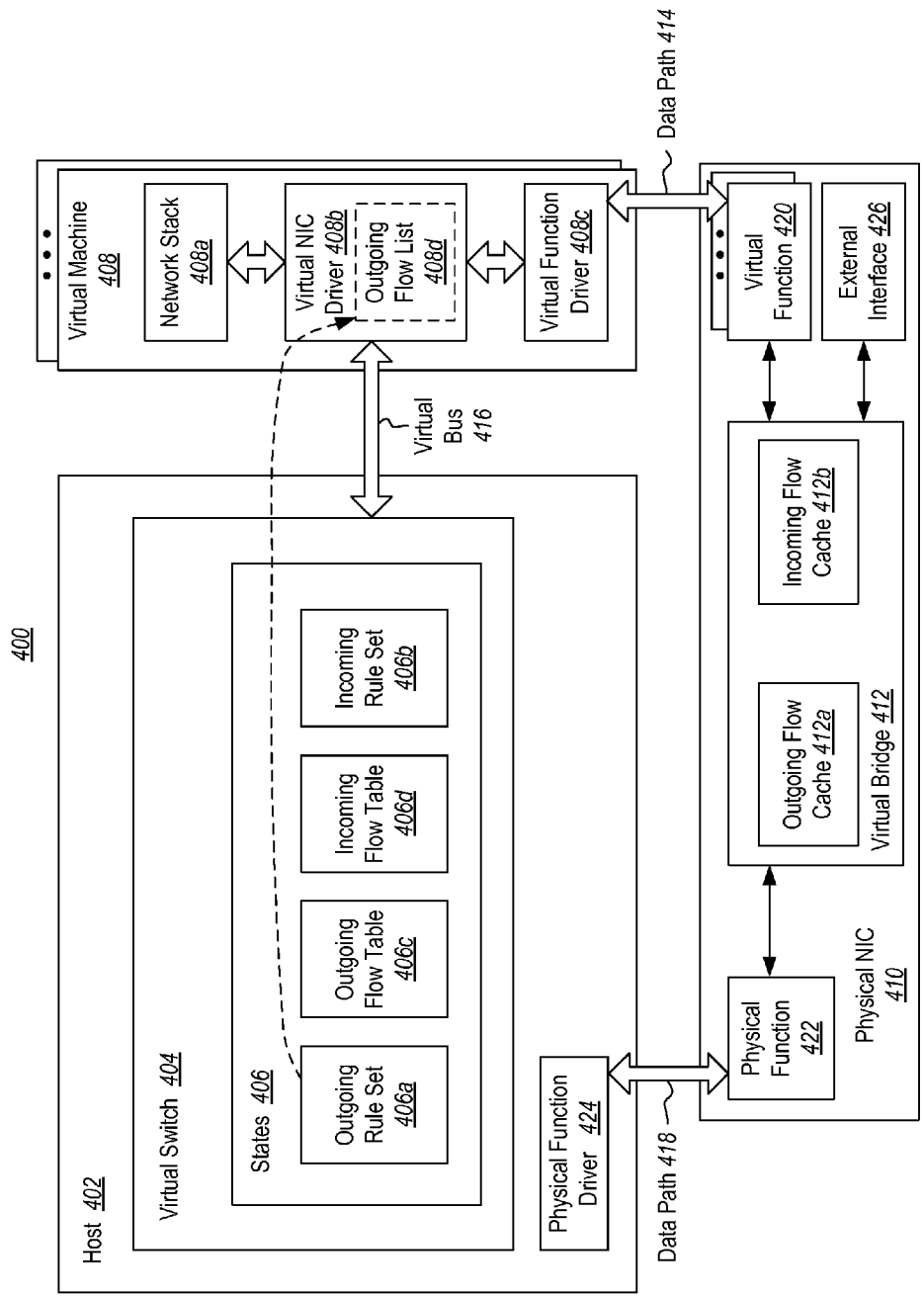
FIG. 4 illustrates an alternate computer architecture that facilitates offloading packet processing to a physical NIC for networking device virtualization.

FIG. 4 illustrates an alternate computer architecture 400 that facilitates offloading packet processing to a physical NIC for networking device virtualization, and that provides one or more potential optimizations over computer architecture 100. In some embodiments, computer architecture 400 may be combined with computer architecture 100. As depicted, computer architecture 400 includes components that are analogous to components of computer architecture 100, such as host 402, virtual machine 408, and physical NIC 410. In computer architecture 400, however, virtual NIC driver 408b at virtual machine 408 includes outgoing flow list 408d. Thus, virtual NIC driver 408b maintains information about some or all of the outgoing flows. As such, even before sending a network packet to virtual function 420 with virtual function driver 408c, virtual NIC driver 408b can determine whether the network packet matches an outgoing flow based on outgoing flow list 408d. If a match is found, then the network packet may also match a flow in outgoing flow cache 412a (if the flow has been offloaded to physical NIC 410). When the packet does not match a flow based on outgoing flow list 408d, virtual NIC driver 408b can directly forward the packet to virtual switch 404, without first sending the packet to physical NIC 410.

In some situations, virtual machine 408 may be an un-trusted entity. Thus, whether or not the packet can ultimately be sent to a destination is still determined by virtual bridge 412 at physical NIC 410 and/or virtual switch 404. For example, even if a flow exists in outgoing flow list 408d and virtual machine 408 sends a network packet to physical NIC 410, virtual bridge 412 still verifies the packet against outgoing flow cache 412a.

In some embodiments, it may be desirable to store only a portion of the outgoing flows in outgoing flow list 408d. For example, some information in the outgoing flows may be confidential (e.g., an IP addresses that will be used for NAT) and, as noted, virtual machine 408 may be an un-trusted entity. As such, outgoing flow list 408d may contain a list of flow (i.e., conditional information used to match a packet to a flow) with no action information. Outgoing flow list 408d may therefore provide only enough information to enable virtual NIC driver 408b to make the decision of whether to send the packet to physical NIC 410 or to host 402.

Figure 5:
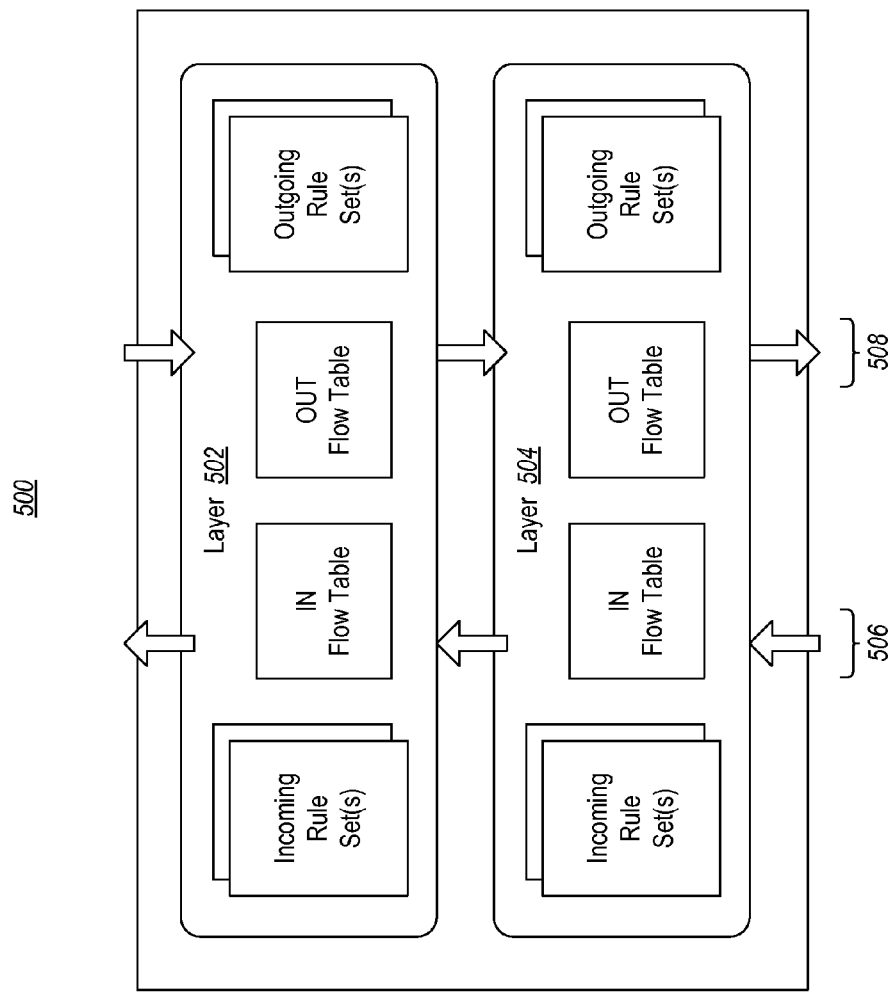
FIG. 5 illustrates an example computer architecture that includes layers of an example multi-layer virtual switch.

FIG. 5 illustrates an example computer architecture 500 that includes layers of an example multi-layer virtual switch. For example, virtual switch 104 may include layers of rules and flows for each virtual machine. Each depicted layer includes an independent set of rule sets and flow tables. As depicted, for example, the layers may include layer 502 and layer 504. Network packets traverse the layers in one of two directions based on the whether the network packet is being sent or received. When a network packet is being received on behalf of a virtual machine, for example, the packet may traverse the layers from the bottom layer up (i.e., from layer 504 to layer 502, as depicted by arrows 506). Contrastingly, when a network packet is being sent from a virtual machine, the packet may traverse the layers from the top layer down (i.e., from layer 502 to layer 504, as depicted by arrows 508).

In some embodiments, each layer matches a network packet with its own flow/rule set and takes any appropriate action before forwarding the packet to the next layer. For example, a packet may be de-capsulated at layer 504 and then be subject to a NAT operation at layer 502. In some embodiments, the packet stops traversing the layers and is discarded if a "block" action is taken. Although virtual switch 104 may include layers of flow tables, these flows are typically stored in flat manner when offloaded to physical NIC 110.

Accordingly, the present invention provides a generic rule and flow model that enables flows to be offloaded to a physical NIC. Offloading flows enables some packet processing to be performed at the physical NIC and eliminates the need to send some packets to a host's virtual switch for processing. As such, the present invention can reduce CPU usage and latency associated with processing network packets for virtual machines.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a physical network interface card (NIC) and executing a host partition, a method for processing network packets for a virtual machine executing at the computer system, the method comprising:
    an act of the physical NIC maintaining one or more flow tables for the virtual machine, the one or more flow tables being based on one or more rule sets for the virtual machine that are maintained at the host partition;
    an act of the physical NIC receiving a network packet associated with the virtual machine; and
    an act of processing the network packet for the virtual machine, including:
        an act of the physical NIC comparing the network packet with the one or more flow tables, and
        when the network packet matches with a flow in the one or more flow tables, an act of the physical NIC performing an action on the network packet based on the matching flow, or
        when the network packet does not match with a flow in the one or more flow tables, an act of the physical NIC passing the network packet to the host partition for processing against the one or more rule sets, including the physical NIC passing the network packet to the host partition through the virtual machine.

2. The method as recited in claim 1, wherein the one or more rule sets include one or more of an incoming rule set or an outgoing rule set for the virtual machine.

3. The method as recited in claim 1, wherein the one or more flow tables include one or more of an incoming flow table or an outgoing flow table for the virtual machine.

4. The method as recited in claim 1, further comprising, when the network packet does not match with a flow in the one or more flow tables, an act of the host partition comparing the network packet with the one or more rule sets.

5. The method as recited in claim 4, wherein when the network packet matches with a rule in the one or more rule sets, an act of the host partition performing an action on the network packet based on the matching rule.

6. The method as recited in claim 5, wherein when the network packet matches with a rule in the one or more rule sets, an act of the host partition creating one or more flows at the physical NIC in the one or more flow tables.

7. The method as recited in claim 1, further comprising an act of the host partition maintaining one or more flow tables for the virtual machine, and wherein the one or more flow tables maintained at the physical NIC comprise a subset of the one or more flow tables maintained at the host partition.

8. The method as recited in claim 1, further comprising:
    an act of a virtual NIC driver at the virtual machine storing at least a portion of an outgoing flow table in an outgoing flow list; and
    an act of the virtual NIC driver comparing the network packet with the outgoing flow list prior to sending the network packet to the physical NIC.

9. The method as recited in claim 1, wherein the computer system executes a plurality of virtual machines, and wherein act of the host partition maintaining one or more rule sets for the virtual machine comprises an act of the host partition maintaining different rule sets for each of the plurality of virtual machines.

10. The method as recited in claim 1, wherein the computer system executes a plurality of virtual machines, and wherein the act of the physical NIC maintaining one or more flow tables for the virtual machine comprises an act of the physical NIC maintaining different flow tables for each of the plurality of virtual machines.

11. The method as recited in claim 1, wherein the host partition maintains a plurality of layers of rule sets, each layer including a corresponding incoming rule set and a corresponding outgoing rule set, and wherein the host partition processes network packets by passing each network packet through each layer while, at each layer, matching each network packet against one of the corresponding incoming rule set or the corresponding outgoing rule set.

12. A computer program product comprising one or more hardware storage devices having stored thereon computer executable instructions that, when executed by one or more processors of a computer system, cause the computer system to implement a method for processing network packets for a virtual machine executing at the computer system, the method comprising:
    an act of a virtual switch maintaining one or more rule sets for a virtual machine, including maintaining a plurality of layers of rule sets, each layer including a corresponding incoming rule set and a corresponding outgoing rule set;
    an act of the virtual switch maintaining one or more flow table for the virtual machine;
    an act of the virtual switch offloading at least a portion of the one or more flow tables to the physical NIC; and
    an act of the virtual switch processing a network packet for the virtual machine, including:
        the virtual switch receiving the network packet from one of the virtual machine or the physical NIC;
        the virtual switch matching the network packet with a rule in the one or more rule sets, including the virtual switch passing each network packet through each layer of the plurality of layers of rule sets while, at each layer, the virtual switch matching each network packet against one of the corresponding incoming rule set or the corresponding outgoing rule set; and
        based on matching the network packet with the rule:
            the virtual switch creating a flow in the one or more flow tables; and
            the virtual switch offloading the flow to the physical NIC.

13. The computer program product as recited in claim 12, wherein the act of the virtual switch processing a network packet for the virtual machine also includes:
    the virtual switch performing at least one action on the network packet based on the rule.

14. The computer program product as recited in claim 13, wherein the at least one action comprises one or more of a packet inspection or a packet manipulation operation.

15. A computer system, comprising:
  one or more processors;
  system memory;
  a physical network interface card (NIC); and
  one or more computer storage media having stored thereon computer-executable instructions that, when executed by the one or more processors, execute a virtual switch, the virtual switch being configured to:
    execute within a host partition at the computer system;
    maintain an incoming rule set and an outgoing rule set for a virtual machine;
    maintain an incoming flow table and an outgoing flow table for the virtual machine;
    offload at least a portion of one or more of the incoming flow table or the outgoing table to a virtual bridge at the physical NIC; and
    process a network packet for the virtual machine, including:
      receiving the network packet from one or more of the virtual machine or the physical NIC;
      matching the network packet with a rule in one of the incoming rule set or the outgoing rule set, including the virtual switch passing each network packet through each layer of the plurality of layers of rule sets while, at each layer, the virtual switch matching each network packet against one of the corresponding incoming rule set or the corresponding outgoing rule set; and
      based on matching the network packet with the rule:
        creating a flow in one or more of the incoming flow table or the outgoing flow table at the virtual switch; and
        offloading the flow to one or more of the incoming flow table or the outgoing table at the virtual bridge of the physical NIC.

16. The computer system as recited in claim 15, wherein the physical NIC comprises a Peripheral Component Interconnect Express (PCIe) NIC.

17. The computer system as recited in claim 16, wherein the physical NIC presents a Single Root I/O Virtualization (SRIOV) function to the virtual machine.

18. The computer system as recited in claim 15, wherein the virtual switch passing each network packet through each layer of the plurality of layers of rule sets comprises passing each network packet through each layer of the plurality of layers in a first direction for packet that are being sent by the virtual machine, and passing each network packet through each layer of the plurality of layers in a second opposite direction for packets that are being received by the virtual machine.

19. The computer system as recited in claim 15, wherein while, at each layer, the virtual switch matching each network packet against one of the corresponding incoming rule set or the corresponding outgoing rule set comprises performing an action on each packet prior to forwarding the packet to a next layer.

20. The computer system as recited in claim 19, further comprising refraining from forwarding the packet to the next layer when the action comprises a block action.

* * * * *